US007698659B1

(12) United States Patent
Rainwater et al.

(10) Patent No.: US 7,698,659 B1
(45) Date of Patent: Apr. 13, 2010

(54) METHODS AND APPARATUS FOR FORMATTING PORTION OF CONTENT

(75) Inventors: Craig D. Rainwater, Seattle, WA (US); Stephen H. Pellegrin, Seattle, WA (US); Robin Briggs, Seattle, WA (US)

(73) Assignee: Adobe Systems Inc., San Jose, CA (US)

( * ) Notice: Subject to any disclaimer, the term of this patent is extended or adjusted under 35 U.S.C. 154(b) by 1032 days.

(21) Appl. No.: 11/393,175

(22) Filed: Mar. 29, 2006

(51) Int. Cl.
*G06F 3/048* (2006.01)
(52) U.S. Cl. ....................... 715/854; 715/853
(58) Field of Classification Search ................... 715/854
See application file for complete search history.

(56) References Cited

U.S. PATENT DOCUMENTS

2004/0205448 A1* 10/2004 Grefenstette et al. ........ 715/500
2004/0216149 A1* 10/2004 Reitz et al. ................... 719/329
2005/0273460 A1* 12/2005 Abrams et al. ................. 707/2
2006/0036504 A1* 2/2006 Allocca et al. ................ 705/26
2007/0071239 A1* 3/2007 Fang .......................... 380/228

* cited by examiner

*Primary Examiner*—Weilun Lo
*Assistant Examiner*—Kim-Lynn Dam
(74) *Attorney, Agent, or Firm*—Chapin IP Law, LLC

(57) ABSTRACT

A system receives a selection of a portion of digital content within a graphical user interface. The system traverses the entire digital content to identify a plurality of components associated with the portion of digital content, and applies at least one policy to each of the plurality of components to select those components necessary to recreate the portion of digital content. The system exports the portion of digital content and the plurality of selected components necessary to recreate the portion of digital content. The system then recreates the portion of digital content using the plurality of selected components necessary to recreate the portion of digital content.

20 Claims, 10 Drawing Sheets

206 TRAVERSE THE ENTIRE DIGITAL CONTENT TO IDENTIFY A PLURALITY OF COMPONENTS ASSOCIATED WITH THE PORTION OF DIGITAL CONTENT

207 REPRESENT THE ENTIRE DIGITAL CONTENT AS A LOGICAL TREE WITH A PLURALITY OF OBJECTS

208 REPRESENT THE ENTIRE DIGITAL CONTENT AS A LOGICAL TREE COMPRISED OF A PLURALITY OF SUB TREES, EACH OF THE PLURALITY OF SUB TREES COMPRISED OF A PLURALITY OF OBJECTS

209 ESTABLISH A STARTING POINT TO TRAVERSE THE LOGICAL TREE THAT REPRESENTS THE ENTIRE DIGITAL CONTENT

210 ESTABLISH A STARTING POINT AT ANY POINT IN THE LOGICAL TREE AND THE PLURALITY OF SUB TREES

*FIG. 5*

211 REPRESENT THE ENTIRE DIGITAL CONTENT AS A LOGICAL TREE COMPRISED OF A PLURALITY OF SUB TREES, EACH OF THE PLURALITY OF SUB TREES COMPRISED OF A PLURALITY OF OBJECTS

212 REPRESENT AT LEAST ONE SET OF CHILD OBJECTS, THE SET OF CHILD OBJECTS DESCENDING FROM A RESPECTIVE OBJECT WITHIN THE PLURALITY OF OBJECTS

OR

213 REPRESENT AN OBJECT REFERENCE, THE OBJECT REFERENCE DEPICTING A REFERENCE BETWEEN AN ATTRIBUTE OF AN OBJECT WITHIN THE PLURALITY OF OBJECTS AND AN ATTRIBUTE OBJECT WITHIN THE PLURALITY OF OBJECTS

*FIG. 6*

214 TRAVERSE THE ENTIRE DIGITAL CONTENT TO IDENTIFY A PLURALITY OF COMPONENTS ASSOCIATED WITH THE PORTION OF DIGITAL CONTENT

215 IDENTIFY A DIGITAL CONTENT ROOT ELEMENT

216 IDENTIFY A PLURALITY OF ROOT ELEMENT ITEMS WITHIN A DIGITAL CONTENT ROOT ELEMENT LIST ASSOCIATED WITH THE DIGITAL CONTENT ROOT ELEMENT

217 IDENTIFY A PLURALITY OF OBJECTS THAT CORRESPOND TO THE PLURALITY OF ROOT ELEMENT ITEMS WITHIN THE DIGITAL CONTENT ROOT ELEMENT LIST

218 IDENTIFY A PLURALITY OF OBJECT ATTRIBUTES THAT CORRESPOND TO THE PLURALITY OF OBJECTS

219 IDENTIFY A PLURALITY OF CHILD OBJECTS THAT DESCEND FROM THE PLURALITY OF OBJECTS

*FIG. 7*

```
┌─────────────────────────────────────────────────────────────────────┐
│ 225 APPLY AT LEAST ONE POLICY TO EACH OF THE PLURALITY OF           │
│ COMPONENTS TO SELECT THOSE COMPONENTS NECESSARY TO RECREATE         │
│ THE PORTION OF DIGITAL CONTENT                                      │
│  ┌───────────────────────────────────────────────────────────────┐  │
│  │ 226 RECEIVE NOTIFICATION THAT DIGITAL CONTENT DATA HAS BEEN   │  │
│  │ IDENTIFIED                                                    │  │
│  └───────────────────────────────────────────────────────────────┘  │
│                                    │                                │
│                                    ▼                                │
│  ┌───────────────────────────────────────────────────────────────┐  │
│  │  ┌─────────────────────────────────────────────────────────┐  │  │
│  │  │ 227 APPLY A POLICY TO THE DIGITAL CONTENT DATA TO ADD   │  │  │
│  │  │ THE DIGITAL CONTENT DATA FROM THE PLURALITY OF          │  │  │
│  │  │ COMPONENTS ASSOCIATED WITH THE PORTION OF DIGITAL       │  │  │
│  │  │ CONTENT                                                 │  │  │
│  │  └─────────────────────────────────────────────────────────┘  │  │
│  │                                                               │  │
│  │                              OR                               │  │
│  │                                                               │  │
│  │  ┌─────────────────────────────────────────────────────────┐  │  │
│  │  │ 228 APPLY A POLICY TO THE DIGITAL CONTENT DATA TO       │  │  │
│  │  │ REMOVE THE DIGITAL CONTENT DATA TO THE PLURALITY OF     │  │  │
│  │  │ COMPONENTS ASSOCIATED WITH THE PORTION OF DIGITAL       │  │  │
│  │  │ CONTENT                                                 │  │  │
│  │  └─────────────────────────────────────────────────────────┘  │  │
│  └───────────────────────────────────────────────────────────────┘  │
└─────────────────────────────────────────────────────────────────────┘
```

*FIG. 9*

METHODS AND APPARATUS FOR FORMATTING PORTION OF CONTENT

BACKGROUND

Conventional computerized devices, such as personal computers, laptop computers, and the like utilize graphical user interfaces in applications such as operating systems and graphical editors (i.e., web page editors, document editors, etc.) that enable users to quickly provide input and create documents and/or projects using "What You See Is What You Get" (WYSIWYG) technology. In general, using a graphical user interface, a user operates an input device such as a mouse or keyboard to manipulate graphical objects on a computer display. The graphical objects are often represented as icons and the user can operate an input device such as a mouse to move a mouse pointer onto an icon (i.e., graphically overlapping the icon) on the graphical user interface. By depressing a mouse button, the application such as the operating system desktop selects the icon and if the user maintains the mouse button in a depressed state, the user can drag the icon across the graphical user interface. By releasing the mouse button, the icon is placed on the graphical user interface at the current position of the mouse pointer.

Most conventional document editors also allow users to select a portion of the document content, and move the selected portion of content to a different location either within the document, or into a separate document. Conventional document editors also allow users to select a portion of the document and copy the selected portion to a different location either within the document, or into a separate document, while retaining the selected portion in its original position within the document.

SUMMARY

Conventional technologies for document editing suffer from a variety of deficiencies. In particular, conventional technologies in document editors for document editing that allow users to select portions of the document content to be transferred to another document, or another area of the original document, are limited in that binary representations of objects must be copied to a clipboard, and then pasted to another location or document. Conventional technologies do not externalize objects (i.e., portions of a document) to a file without this intermediary step. Some attempts to export objects resulted in the whole document being exported, not just those objects that were necessary to recreate the selected portion of the document. Additionally, conventional technologies are not backwards compatible with earlier versions of document editors.

Embodiments disclosed herein significantly overcome such deficiencies and provide a system that includes a computer system executing a digital content formatting process that receives a selection of a portion of a document from a user. The user may grab the portion of the document to copy to a desktop, or a library. The digital content formatting process performs a 'closure' process to determine how much data to export to allow the user to write that portion of the document to a file to be used at a later time. The digital content formatting process performs this process of closure by traversing a logical tree (that represents the document) to discover which items (i.e., objects) need to be exported in order to recreate the selected portion of the document. In one embodiment, the document is traversed depth first. The digital content formatting process identifies objects, and child objects associated with those objects. As each object is identified, the digital content formatting process applies a policy to that object. The policies determine whether to add that object to the list of objects to be exported or to remove that object from the list of objects to be exported. In one embodiment, the digital content formatting process begins this process of closure at the root of the document. In another embodiment, the digital content formatting process begins this process of closure at any point in the tree, or any point in any sub tree that is related to the logical tree representing the document. As the digital content formatting process traverses the tree, the digital content formatting process identifies objects that correspond to the portion of the document that was selected. The digital content formatting process examines the attributes of each object to identify any additional objects that are also required when recreating the selected portion of the document. The digital content formatting process compiles a list of all the required objects, and serializes the data for output. A user can select a portion of a document, and the digital content formatting process will perform the process of closure such that the user can utilize that portion of the document using an earlier version of a document editor. Thus the user can move the selected portion of the document to a library or desktop, and the digital content formatting process recreates the selected portion of the document. Conventional techniques are often binary copy & paste. Embodiments disclosed herein implement Extensible Markup language (XML). XML has some inherent advantages because it allows independent inspection, creation, and editing. With XML, it is difficult to identify all the objects that comprise a portion of a document if those objects are not placed together in the XML as part of an entire sub-tree. This can make it difficult to export a part of the document without exporting the entire document. Embodiments disclosed herein allow systematic location of objects in the document that are required to export the portion of the document, as well as provide a way for a plug-in or other external piece of code to control which objects are considered to be required, and which are not. As objects are added, their dependencies are noted, and more objects are identified. The applied policy then has the choice of including those objects as well.

Thus, generating portions of the document are fairly easy. The result is XML code that contains a high-level description of the objects. The XML code is version independent, robust against mistakes (since dependencies are automatically generated), and allows the XML code to be broken up into a number of separate files. The XML code can be stored independently from the application, either on a clipboard or persistently in a file (or other off-line storage), and later imported into a document.

Embodiments disclosed herein include a computer system executing a digital content formatting process that receives a selection of a portion of digital content within a graphical user interface. The digital content formatting process traverses the entire digital content to identify a plurality of components associated with the portion of digital content, and applies at least one policy to each of the plurality of components to select those components necessary to recreate the portion of digital content. The digital content formatting process exports the portion of digital content, and the plurality of selected components necessary to recreate the portion of digital content. The digital content formatting process recreates the portion of digital content using the plurality of selected components necessary to recreate the portion of digital content.

During an example operation of one embodiment, suppose a user, operating a document editor within a graphical user interface, selects a portion of a document. The user selects the portion of the document, for example, a blue rectangle. The digital content formatting process begins traversing the entire document, starting with the selected objects (i.e., the blue rectangle), to identify objects related to the portion of the document. The digital content formatting process identifies the blue rectangle object as an object that is to be added to a list of objects to export. The digital content formatting process identifies that the blue rectangle object has a fill color of blue. The digital content formatting process then identifies the blue object associated with that shade of blue, and adds the blue object to the list of objects to export. As each object is identified, the digital content formatting process applies a policy to the object to determine whether to add that object to the list of objects to export, or to remove that object from the list of objects to export. For example, if the blue object had already been added to the list of objects to export from a previous section of the portion of the document, then the applied policy would remove this blue object from the list of objects to export. The digital content formatting process continues in this manner to compile the list of objects to export until all the objects needed to export the blue rectangle object have been identified. The digital content formatting process then serializes the collected data for exporting. As the user selects the blue rectangle object within the document editor within a graphical user interface, and drags it to the desktop (i.e., imports the selected portion of content to another digital content), the digital content formatting process de-serializes the data, and invokes a script to create the rectangle object with the attribute of blue. Thus, the blue rectangle object is recreated on the user's desktop. If, during the invocation of the script, the creation of the rectangle object fails, the digital content formatting process ignores the rest of the attributes (i.e., the blue object) associated with the blue rectangle object.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Adobe Systems Incorporated of San Jose, Calif.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 5 illustrates a flowchart of a procedure performed by the system of FIG. 1, when the digital content formatting process represents the entire digital content as a logical tree comprised of a plurality of sub trees, each of the plurality of sub trees comprised of a plurality of objects, according to one embodiment disclosed herein.

FIG. 6 illustrates a flowchart of a procedure performed by the system of FIG. 1, when the digital content formatting process traverses the entire digital content to identify a plurality of components associated with the portion of digital content, starting at a root element, according to one embodiment disclosed herein.

FIG. 7 illustrates a flowchart of a procedure performed by the system of FIG. 1, when the digital content formatting process identifies the at least one child object that descend from the plurality of objects, according to one embodiment disclosed herein.

FIG. 9 illustrates a flowchart of a procedure performed by the system of FIG. 1, when the digital content formatting process recreates the portion of digital content using the plurality of selected components necessary to recreate the portion of digital content, according to one embodiment disclosed herein.

DETAILED DESCRIPTION

Figure 1:
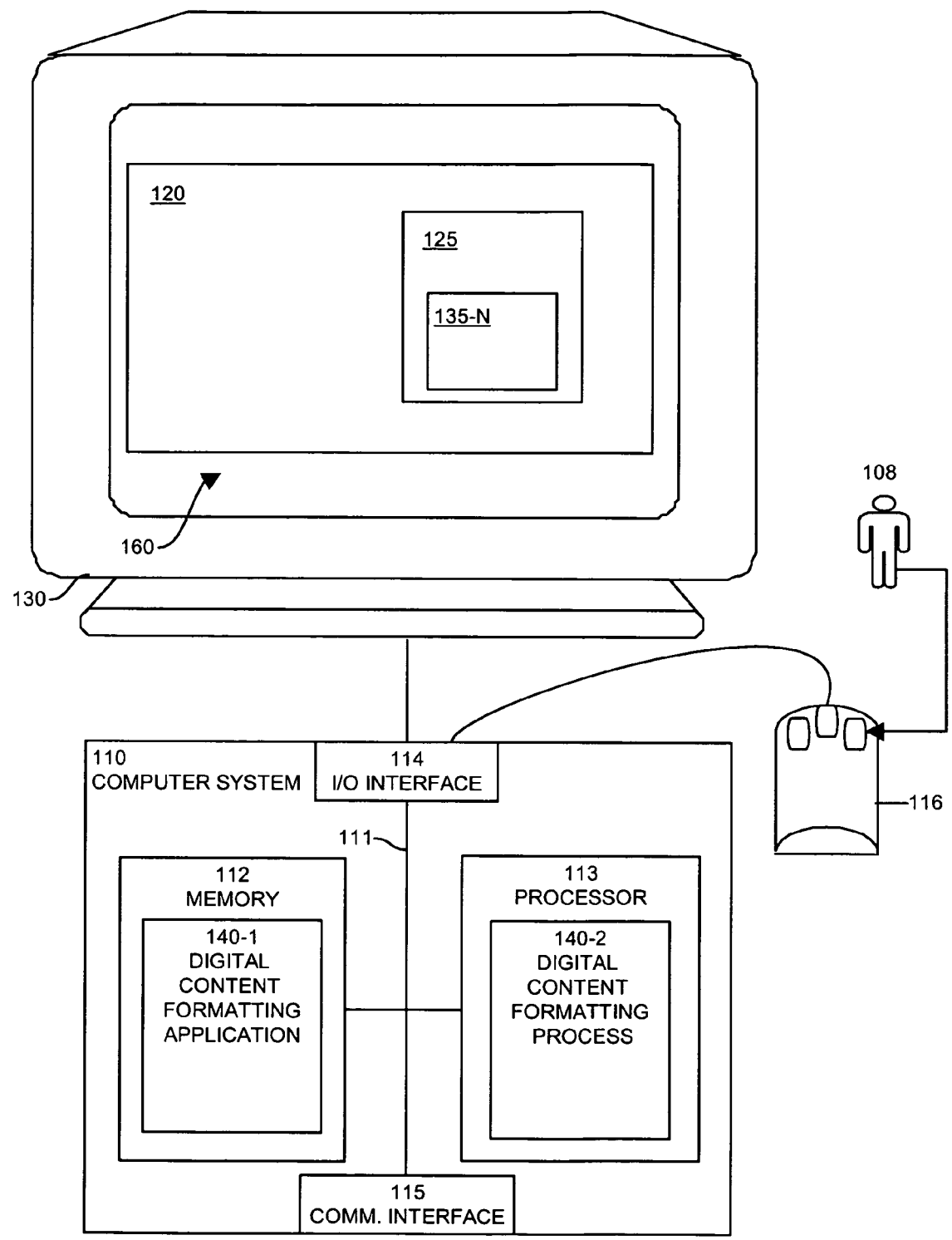
FIG. 1 shows a high level view of a document editor according to one embodiment disclosed herein.

Embodiments disclosed herein include a digital content formatting process that receives a selection of a portion of a document (for example, from a user, or from an automated process). The user may grab the portion of the document to copy to a desktop or a library. The digital content formatting process performs a 'closure' process to determine how much data to export to allow the user to write that portion of the document to a file to be used at a later time. The digital content formatting process performs this process of closure by traversing a logical tree (that represents the document) to discover which items (i.e., objects) need to be exported in order to recreate the selected portion of the document. The digital content formatting process identifies objects, and child objects associated with those objects. As each object is identified, the digital content formatting process applies a policy to that object. The policies determine whether to add that object to the list of objects to be exported or to remove that object from the list of objects to be exported. In one embodiment, the digital content formatting process begins this process of closure at the root of the document. In another embodiment, the digital content formatting process begins this process of closure at any point in the tree, or any point in any sub tree that is related to the logical tree representing the document. As the digital content formatting process traverses the tree, the digital content formatting process identifies objects that correspond to the portion of the document that was selected. The digital content formatting process examines the attributes of each object to identify any additional objects that also need to be included when recreating the selected portion of the document. The digital content formatting process compiles a list of all the required objects, and serializes the data for output. A user can select a portion of a document, and the digital content formatting process will perform the process of closure such that the user can utilize that portion of the document using an earlier version of a document editor.

Embodiments disclosed herein include a computer system executing a digital content formatting process that receives a selection of a portion of digital content within a graphical user interface. The digital content formatting process traverses the entire digital content to identify a plurality of components associated with the portion of digital content, and applies at least one policy to each of the plurality of components to select those components necessary to recreate the portion of digital content. The digital content formatting process exports the portion of digital content, and the plurality of selected components necessary to recreate the portion of digital content. The digital content formatting process recreates the portion of digital content using the plurality of selected components necessary to recreate the portion of digital content.

Applications equipped with the digital content formatting process can include, for example, word processors, web page editors, portable document format (PDF) document editors, software code editors, graphics editors, or the like.

FIG. 1 is a block diagram illustrating example architecture of a computer system 110 that executes, runs, interprets, operates or otherwise performs a digital content formatting application 140-1 and process 140-2. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a keyboard, mouse, etc.) couples to processor 113 through I/O interface 114, and enables a user 108 to provide input commands and generally control the graphical user interface 160 that the digital content formatting application 140-1 and process 140-2 provides on the display 130. The graphical user interface 160 displays the entire digital content 120, containing the portion of digital content 125, and a plurality of component 135-N associated with the portion of digital content 125. The communications interface 115 enables the computer system 110 to communicate with other devices (i.e., other computers) on a network (not shown). This can allow access to the digital content formatting application by remote computer systems and in some embodiments, the portion of digital content 125 can be obtained from a remote source via the communications interface 115.

The memory system 112 is any type of computer readable medium and in this example is encoded with a digital content formatting application 140-1. The digital content formatting application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the digital content formatting application 140-1. Execution of digital content formatting application 140-1 in this manner produces processing functionality in a digital content formatting process 140-2. In other words, the digital content formatting process 140-2 represents one or more portions of runtime instances of the digital content formatting application 140-1 (or the entire application 140-1) performing or executing within or upon the processor 113 in the computerized device 110 at runtime.

Figure 2:
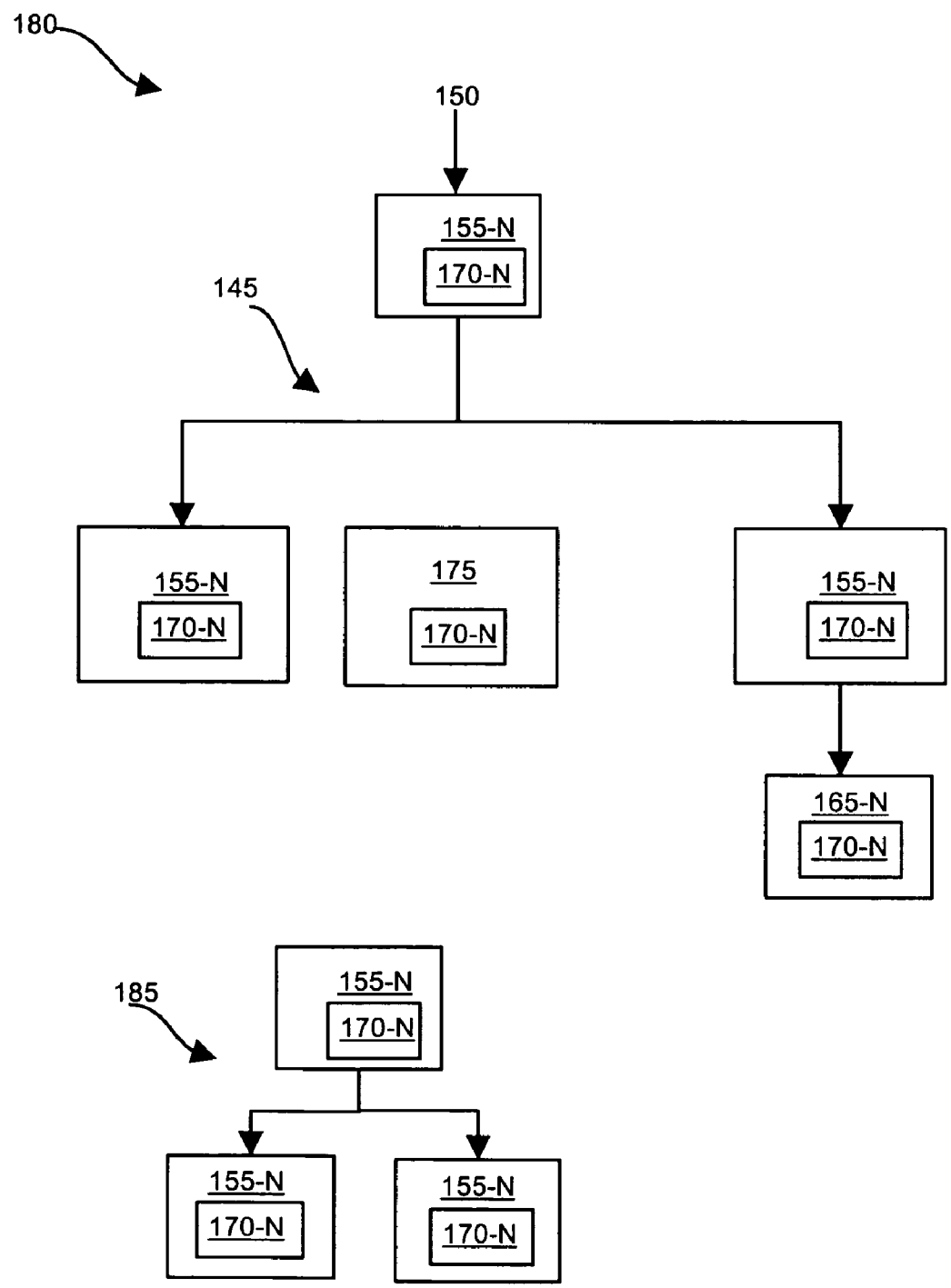
FIG. 2 shows a high level view of a logical tree representing a document within the document editor depicted within FIG. 1, according to one embodiment disclosed herein.

FIG. 2 is a block diagram illustrating an example digital content data 180. A logical tree 145 contains a plurality of objects 155-N. Each object 155-1 within the plurality of objects 155-N contains attributes 170-N. An object 155-1 can also have at least one child object 165-1, each of which also has attributes 170-N. A sub tree 185 can contain a plurality of objects 155-N, each of which can contain attributes 170-N. An object 155-1 can reference another attribute object 175 containing attributes 170-N. The logical tree 145 can have any number of sub trees 185-N.

Figure 3:
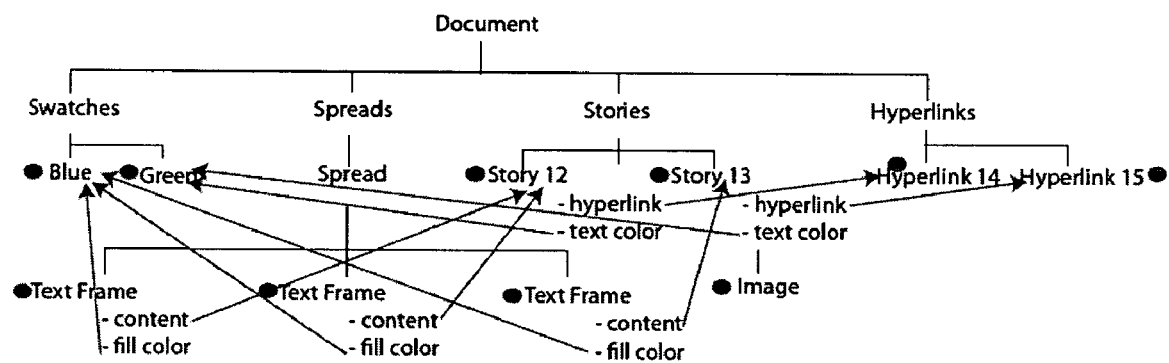
FIG. 3 illustrates a flowchart of a procedure performed by the system of FIG. 1, when the digital content formatting process receives a selection of a portion of digital content within a graphical user interface, according to one embodiment disclosed herein.

FIG. 3 is a diagram of a document object model. In an example embodiment, a user 108 selects a set of objects in the document. The digital content formatting process 140-2 begins iterating over these objects, and finds dependent objects. A policy is applied to each object, and the policy allows inclusion of the new objects. The digital content formatting process 140-2 begins iterating over the new objects, and finds dependent objects. The policy then allows inclusion of the new objects. The digital content formatting process 140-2 begins iterating over the newly discovered objects, and finds no further dependent objects. The digital content formatting process 140-2 then serializes all identified and approved objects.

Further details of configurations explained herein will now be provided with respect to a flow chart of processing steps that show the high level operations disclosed herein to perform the content formatting process.

Figure 4:
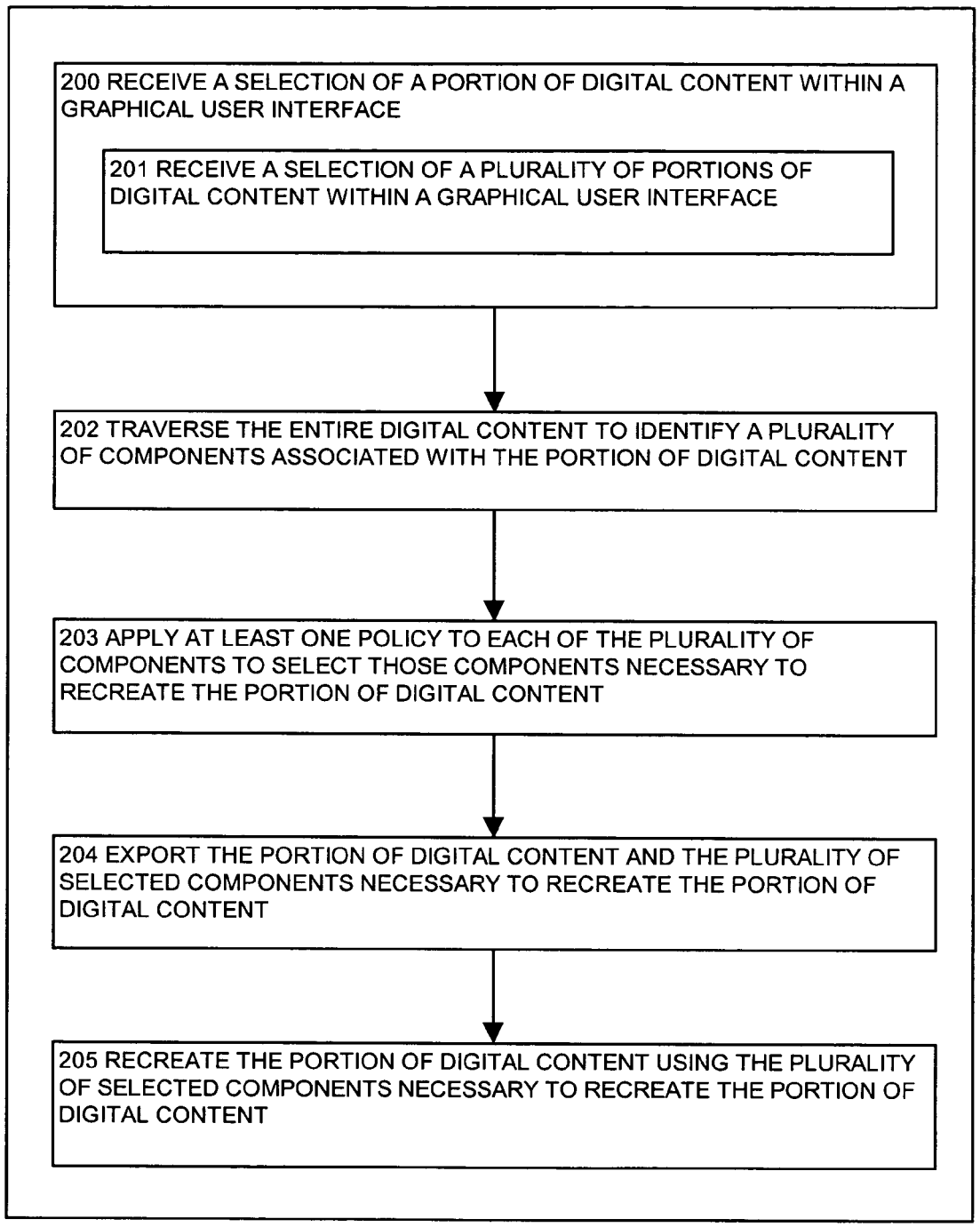
FIG. 4 illustrates a flowchart of a procedure performed by the system of FIG. 1, when the digital content formatting process traverses the entire digital content to identify a plurality of components associated with the portion of digital content, according to one embodiment disclosed herein.

FIG. 4 is an embodiment of the steps performed by the digital content formatting process 140-2 when it receive a selection of a portion of digital content 125 within a graphical user interface 160, and traverses the entire digital content 120 to identify a plurality of components 135-N associated with the portion of digital content 125.

In step 200, the digital content formatting process 140-2 receives a selection of a portion of digital content 125 within a graphical user interface 160. In an example embodiment, a user 108, operating a document editor within the graphical user interface 160, selects a portion of digital content 125 from the entire digital content 120 within the document editor. For example, a user 108, operating a graphic design editor within the graphical user interface 160, selects a snippet (i.e., a portion of digital content 125) from the entire digital content 120, and the digital content formatting process 140-2 receives the selection of the snippet (i.e., a portion of digital content 125) from the document editor within the graphical user interface 160.

In step 201, the digital content formatting process 140-2 receives a selection of a plurality of portions of digital content 125 within a graphical user interface 160. In an example embodiment, a user 108, operating a document editor within the graphical user interface 160, selects more than one portion of digital content 125 from the entire digital content 120 within the document editor. For example, a user 108, operating a graphic design editor within the graphical user interface 160, selects several snippets (i.e., portions of digital content 125) from the entire digital content 120. The digital content formatting process 140-2 receives the selection of the several snippets (i.e., portions of digital content 125) from the document editor within the graphical user interface 160. The snippets (i.e., portions of digital content 125) are selected for exporting to, for example, a computer desktop or a library, such that the snippets (i.e., portions of digital content 125) can be used at a later date. For example, a user 108 selects three text frames (i.e., objects 155-N), each of which contains text. The three text frames (i.e., objects 155-N) have a single flow of text running through them. In an example embodiment, the user 108 selects all three text frames (i.e., objects 155-N) to export to a library or desktop.

In step 202, the digital content formatting process 140-2 traverses the entire digital content 120 to identify a plurality of components 135-N associated with the portion of digital content 125. In an example embodiment, the digital content formatting process 140-2 performs the process of 'closure', that is, traversing a logical tree 145 (that represents the entire digital content 120) to identify all objects 155-N related to the portion of digital content 125. During the process of closure, the digital content formatting process 140-2 identifies objects 155-N, child objects 165-N of the objects 155-N, and attributes 170-N for both the objects 155-N, and the child objects 165-N. For example, a text box (i.e., a portion of digital content 125) is comprised of a text box object 155-1 containing a text object 155-2. The text object 155-2 has an attribute 170-1 of the text font, and attribute 170-2 of the text size, and an attribute 170-3 of the text color. The digital content formatting process 140-2 traverses the entire digital content 120 to identify the plurality of these components 135-N (i.e., the text box object 155-1, text object 155-2, text font attribute 170-1, text size attribute 170-2, text color attribute 170-3, etc.) associated with the text box (i.e., the portion of digital content 125) received by the digital content formatting process 140-2.

In step 203, the digital content formatting process 140-2 applies at least one policy to each of the plurality of components 135-N to select those components necessary to recreate the portion of digital content 125. In an example embodiment, the digital content formatting process 140-2 traverses a logical tree 145 (that represents the entire digital content 120) to identify all objects 155-N related to the portion of digital content 125. The digital content formatting process 140-2 applies at least one policy to each of the objects 155-N identified during traversal of the logical tree 145 to determine whether that object 155-1 is needed to recreate the portion of digital content 125. For example, a text box (i.e., a portion of digital content 125) is comprised of a text box object 155-1 and a text object 155-2. The text object 155-2 has an attribute 170-1 of the text font, an attribute 170-2 of the text size, and an attribute 170-3 of the text color. As the digital content formatting process 140-2 identifies the text box object 155-1, the digital content formatting process 140-2 applies a policy to determine if the text box object 155-1 is needed to recreate the portion of digital content. In an example embodiment, the portion of digital content 125 contains two text boxes, text box object 155-1 and text box object 155-3. The digital content formatting process 140-2 identifies text box object 155-1 and applies a policy to the text box object 155-1 to determine if the text box object 155-1 is needed to recreate the portion of digital content 125. The digital content formatting process 140-2 determines that the text box object 155-1 is needed. The digital content formatting process 140-2 continues to traverse the logical tree 145 and identifies the text box object 155-3 and applies a policy to the text box object 155-3 to determine if the text box object 155-3 is needed to recreate the portion of digital content 125. The digital content formatting process 140-2 determines that the text box object 155-3 is not needed (because the text box object 155-1 can be used to recreate both text box object 155-1 and text box object 155-3). Thus, the text box object 155-1 is selected as a component 135-1 necessary to recreate the portion of digital content 125, and text box object 155-3 is not selected as a component 135-2 necessary to recreate the portion of digital content 125.

In step 204, the digital content formatting process 140-2 exports the portion of digital content 125, and the plurality of selected components 135-N necessary to recreate the portion of digital content 125. In an example embodiment, the digital content formatting process 140-2 receives a selection of a portion of digital content 125 within a graphical user interface 160, from a user 108. The digital content formatting process 140-2 traverses the entire digital content 120 to identify a plurality of components 135-N necessary to recreate the portion of digital content 125. In one embodiment, as each component 135-1 is identified, the digital content formatting process 140-2 applies a policy to that component 135-1 to determine whether that component 135-1 is necessary to recreate the portion of digital content 125. The digital content formatting process 140-2 then exports the portion of digital content 125, and the plurality of selected components 135-N necessary to recreate the portion of digital content 125.

In step 205, the digital content formatting process 140-2 recreates the portion of digital content 125 using the plurality of selected components 135-N necessary to recreate the portion of digital content 125. In an example embodiment, a user 108 selects a portion of digital content 125. The digital content formatting process 140-2 receives this selection of a portion of digital content 125. The digital content formatting process 140-2 traverses the entire digital content 120 to identify a plurality of components 135-N necessary to recreate the portion of digital content 125, and applies a policy to the plurality of components 135-N to determine which components 135-N are necessary to recreate the portion of digital content 125. The digital content formatting process 140-2 exports the portion of digital content 125, and the plurality of selected components 135-N necessary to recreate the portion of digital content 125. The digital content formatting process 140-2 then uses the portion of digital content 125, and the plurality of selected components 135-N to recreate the portion of digital content 125. In an example embodiment, a user imports the portion of digital content 125 to a desktop. In this example, the digital content formatting process 140-2 applies a policy to each component 135-1 during the process of importing the portion of digital content 125. The policy is applied to determine if that component 135-1 should be imported to the desktop.

FIG. 5 is an embodiment of the steps performed by the digital content formatting process 140-2 when it traverses the entire digital content 120 to identify a plurality of components 135-N associated with the portion of digital content 125.

In step 206, the digital content formatting process 140-2 traverses the entire digital content 120 to identify a plurality of components 135-N associated with the portion of digital content 125. In an example embodiment, the digital content formatting process 140-2 performs the process of 'closure', that is, traversing a logical tree (that represents the entire digital content 120) to identify all objects 155-N related to the portion of digital content 125. During the process of closure, the digital content formatting process 140-2 identifies objects 155-N, child objects 165-N of the objects 155-N, and attributes 170-N for both the objects 155-N, and the child objects 165-N. For example, a text box (i.e., a portion of digital content 125) is comprised of a text box object 155-1 and a text object 155-2. The text object 155-2 has an attribute 170-1 of the text font, and attribute 170-2 of the text size, and an attribute 170-3 of the text color. The digital content formatting process 140-2 traverses the entire digital content 120 to identify the plurality of these components 135-N (i.e., the text box object 155-1, text object 155-2, text font attribute 170-1, text size attribute 170-2, text color attribute 170-3, etc.) associated with the text box (i.e., the portion of digital content 125) received by the digital content formatting process 140-2. Thus, as the digital content formatting process 140-2 traverses the entire digital content 120 to identify a plurality of components 135-N associated with the portion of digital content 125, the plurality of components 135-N identified are the objects 155-N (i.e., the text box object 155-1, text object 155-2, text font attribute 170-1, text size attribute 170-2, text color attribute 170-3, etc.) associated with the text box (i.e., the portion of digital content 125) received by the digital content formatting process 140-2.

In step 207, the digital content formatting process 140-2 represents the entire digital content 120 as a logical tree 145 with a plurality of objects 155-N. In an example embodiment, the entire digital content 120 is comprised of a plurality of objects 155-N, such as XML structure elements, images, stories, text boxes, etc. Each object 155-1 in the logical tree 145 represents an object 155-1 contained within the document editor within the graphical user interface 160. Each object 155-1 has attributes 170-N that reflect the state of the object 155-1. An attribute 170-1 may contain a reference to another object 155-2. That referenced object (associated with the attribute 170-1) is an attribute object 175. Each object 155-1 can have child objects 165-N that descend from that object 155-1. The child objects 165-N can also have attributes 170-N and attribute objects 175-N that are referenced by the child object 165-1.

In step 208, the digital content formatting process 140-2 represents the entire digital content 120 as a logical tree 145 comprised of a plurality of sub trees 185-N, each of the plurality of sub trees 185-N comprised of a plurality of objects 155-N. In an example embodiment, the logical tree 145 is comprised of a plurality of sub trees 185-N. Each of the plurality of sub trees 185-N can contain a plurality of objects 155-N, and at least one child object 165-1.

In step 209, the digital content formatting process 140-2 establishes a starting point 150 to traverse the logical tree 145 that represents the entire digital content 120. In an example embodiment, the digital content formatting process 140-2 performs the process of 'closure', that is, traversing a logical tree 145 (that represents the entire digital content 120) to identify all objects 155-N related to the portion of digital content 125. Prior to performing the process of closure, the digital content formatting process 140-2 establishes a starting point 150 at which to begin the process of closure. In one embodiment, the starting point 150 is the root of the logical tree 145. During the process of closure, the digital content formatting process 140-2 identifies objects 155-N, child objects 165-N of the objects 155-N, and attributes 170-N for both the objects 155-N, and the child objects 165-N necessary to recreate the portion of digital content 125.

In step 210, the digital content formatting process 140-2 establishes a starting point 150 at any point in the logical tree 145 and the plurality of sub trees 185-N. In an example embodiment, the logical tree 145 is comprised of a plurality of sub trees 185-N. Each of the plurality of sub trees 185-N can contain a plurality of objects 155-N, and at least one child object 165-1. The digital content formatting process 140-2 performs the process of 'closure', that is, traversing a logical tree 145 (that represents the entire digital content 120) to identify all objects 155-N related to the portion of digital content 125. Prior to performing the process of closure, the digital content formatting process 140-2 establishes a starting point 150 at which to begin the process of closure. In one embodiment, the starting point 150 is any leaf in the logical tree 145 or any leaf within any of the sub trees 185-N.

FIG. 6 is an embodiment of the steps performed by the digital content formatting process 140-2 when it represents the entire digital content 120 as a logical tree 145 comprised of a plurality of sub trees 185-N.

In step 211, the digital content formatting process 140-2 represents the entire digital content 120 as a logical tree 145 comprised of a plurality of sub trees 185-N. Each of the plurality of sub trees 185-N is comprised of a plurality of objects 155-N. In an example embodiment, the entire digital content 120 is comprised of a plurality of objects 155-N, such as XML structure elements, images, stories, text boxes, etc. Each object 155-1 in the logical tree 145 represents an object 155-1 contained within the document editor within the graphical user interface 160. The logical tree 145 is comprised of a plurality of sub trees 185-N. Each of the plurality of sub trees 185-N can contain a plurality of objects 155-N, and at least one child object 165-1.

In step 212, the digital content formatting process 140-2 represents at least one set of child objects 165-N, and the set of child objects 165-1 descends from a respective object 155-1 within the plurality of objects 155-N. In an example embodiment, the entire digital content 120 is comprised of a plurality of objects 155-N, such as XML structure elements, images, stories, text boxes, etc. Each object 155-1 in the logical tree 145 represents an object 155-1 contained within the document editor within the graphical user interface 160. Each object 155-1 can have child objects 165-N that descend from that object 155-1.

Alternatively, in step 213, the digital content formatting process 140-2 represents an object reference, the object reference depicting a reference between an attribute 170-1 of an object 155-1 within the plurality of objects 155-N, and an attribute object 175 within the plurality of objects 155-N. In an example embodiment, the entire digital content 120 is comprised of a plurality of objects 155-N, such as XML structure elements, images, stories, text boxes, etc. Each object 155-1 in the logical tree 145 represents an object 155-1 contained within the document editor within the graphical user interface 160. Each object 155-1 has attributes 170-N that reflect the state of the object 155-1. An attribute 170-1 may contain a reference to another object 155-2. That referenced object (associated with the attribute 170-1) is an attribute object 175. Each object 155-1 can have child objects 165-N that descend from that object 155-1. The child objects 165-N can also have attributes 170-N and attribute objects 175-N that are referenced by the child object 165-1.

FIG. 7 is an embodiment of the steps performed by the digital content formatting process 140-2 when it traverses the entire digital content 120 to identify a plurality of components 135-N associated with the portion of digital content 125.

In step 214, the digital content formatting process 140-2 traverses the entire digital content 120 to identify a plurality of components 135-N associated with the portion of digital content 125. In an example embodiment, the digital content formatting process 140-2 performs the process of 'closure', that is, traversing a logical tree 145 (that represents the entire digital content 120), depth first, to identify all objects 155-N related to the portion of digital content 125. During the process of closure, the digital content formatting process 140-2 identifies objects 155-N, child objects 165-N of the objects 155-N, and attributes 170-N for both the objects 155-N, and the child objects 165-N. For example, a text box (i.e., a portion of digital content 125) is comprised of a text box object 155-1 and a text object 155-2. The text object 155-2 has an attribute 170-1 of the text font, and attribute 170-2 of the text size, and an attribute 170-3 of the text color. The digital content formatting process 140-2 traverses the entire digital content 120, depth first, to identify the plurality of these components 135-N (i.e., the text box object 155-1, text object 155-2, text font attribute 170-1, text size attribute 170-2, text color attribute 170-3, etc.) associated with the text box (i.e., the portion of digital content 125) received by the digital content formatting process 140-2.

In step 215, the digital content formatting process 140-2 identifies a digital content root element. In an example embodiment, the logical tree 145 is comprised of a plurality of sub trees 185-N. Each of the plurality of sub trees 185-N can contain a plurality of objects 155-N, and at least one child object 165-1. The digital content formatting process 140-2 performs the process of 'closure', that is, traversing a logical tree 145 (that represents the entire digital content 120) to identify all objects 155-N related to the portion of digital content 125. Prior to performing the process of closure, the digital content formatting process 140-2 establishes a root element (i.e., a starting point 150) at which to begin the process of closure. In one embodiment, the root element (i.e., a starting point 150) is any leaf in the logical tree 145 or any leaf within any of the sub trees 185-N.

In step 216, the digital content formatting process 140-2 identifies a plurality of root element items within a digital content root element list associated with the digital content root element. In an example embodiment, the digital content formatting process 140-2 identifies objects 155-N, child objects 165-N of the objects 155-N, and attributes 170-N for both the objects 155-N, and the child objects 165-N. For example, a text box (i.e., a portion of digital content 125) is comprised of a text box object 155-1 and a text object 155-2. The text object 155-2 has an attribute 170-1 of the text font, and attribute 170-2 of the text size, and an attribute 170-3 of the text color. The digital content formatting process 140-2 identifies the plurality of these components 135-N (i.e., the text box object 155-1, text object 155-2, text font attribute 170-1, text size attribute 170-2, text color attribute 170-3, etc.) associated with the text box (i.e., the portion of digital content 125) received by the digital content formatting process 140-2. Thus, the digital content formatting process 140-2 identifies a plurality of root element items (i.e., the text box object 155-1, text object 155-2, text font attribute 170-1, text size attribute 170-2, text color attribute 170-3, etc.) within a digital content root element list associated with the digital content root element (i.e., the starting point 150) associated with the text box (i.e., the portion of digital content 125) received by the digital content formatting process 140-2. In another example configuration, the digital content formatting process 140-2 identifies a hyperlink within the text object 155-2. The digital content formatting process 140-2 identifies the hyperlink object 155-3 as another root element item to add to the digital content root element list.

In step 217, the digital content formatting process 140-2 identifies a plurality of objects 155-N that correspond to the plurality of root element items within the digital content root element list. In an example embodiment, the digital content formatting process 140-2 identifies a plurality of root element items (i.e., the text box object 155-1, text object 155-2, text font attribute 170-1, text size attribute 170-2, text color attribute 170-3, etc.) within a digital content root element list associated with the digital content root element (i.e., the starting point 150) associated with the text box (i.e., the portion of digital content 125) received by the digital content formatting process 140-2. As the digital content formatting process 140-2 traverses the logical tree 145 (that represents the entire digital content 120) to identify all objects 155-N related to the portion of digital content 125, the digital content formatting process 140-2 identifies (within the logical tree 145) the plurality of objects 155-N that correspond to the plurality of root element items (i.e., the text box object 155-1, text object 155-2, text font attribute 170-1, text size attribute 170-2, text color attribute 170-3, etc.) within the digital content root element list.

In step 218, the digital content formatting process 140-2 identifies a plurality of object attributes 170-N that correspond to the plurality of objects 155-N. In one embodiment, the digital content formatting process 140-2 traverses the logical tree 145 (that represents the entire digital content 120), and identifies (within the logical tree 145) the plurality of objects 155-N that correspond to the plurality of root element items (i.e., the text box object 155-1, text object 155-2, text font attribute 170-1, text size attribute 170-2, text color attribute 170-3, etc.) within the digital content root element list. As each object 155-1 is identified, the digital content formatting process 140-2 identifies the plurality of object attributes 170-N that correspond to that object 155-1.

In step 219, the digital content formatting process 140-2 identifies at least one child object 165-1 that descend from the plurality of objects 155-N. In one embodiment, the digital content formatting process 140-2 traverses the logical tree 145 (that represents the entire digital content 120), and identifies (within the logical tree 145) the plurality of objects 155-N that correspond to the plurality of root element items (i.e., the text box object 155-1, text object 155-2, text font attribute 170-1, text size attribute 170-2, text color attribute 170-3, etc.) within the digital content root element list. As each object 155-1 is identified, the digital content formatting process 140-2 identifies the at least one child object 165-1 that correspond to that object 155-1.

Figure 8:
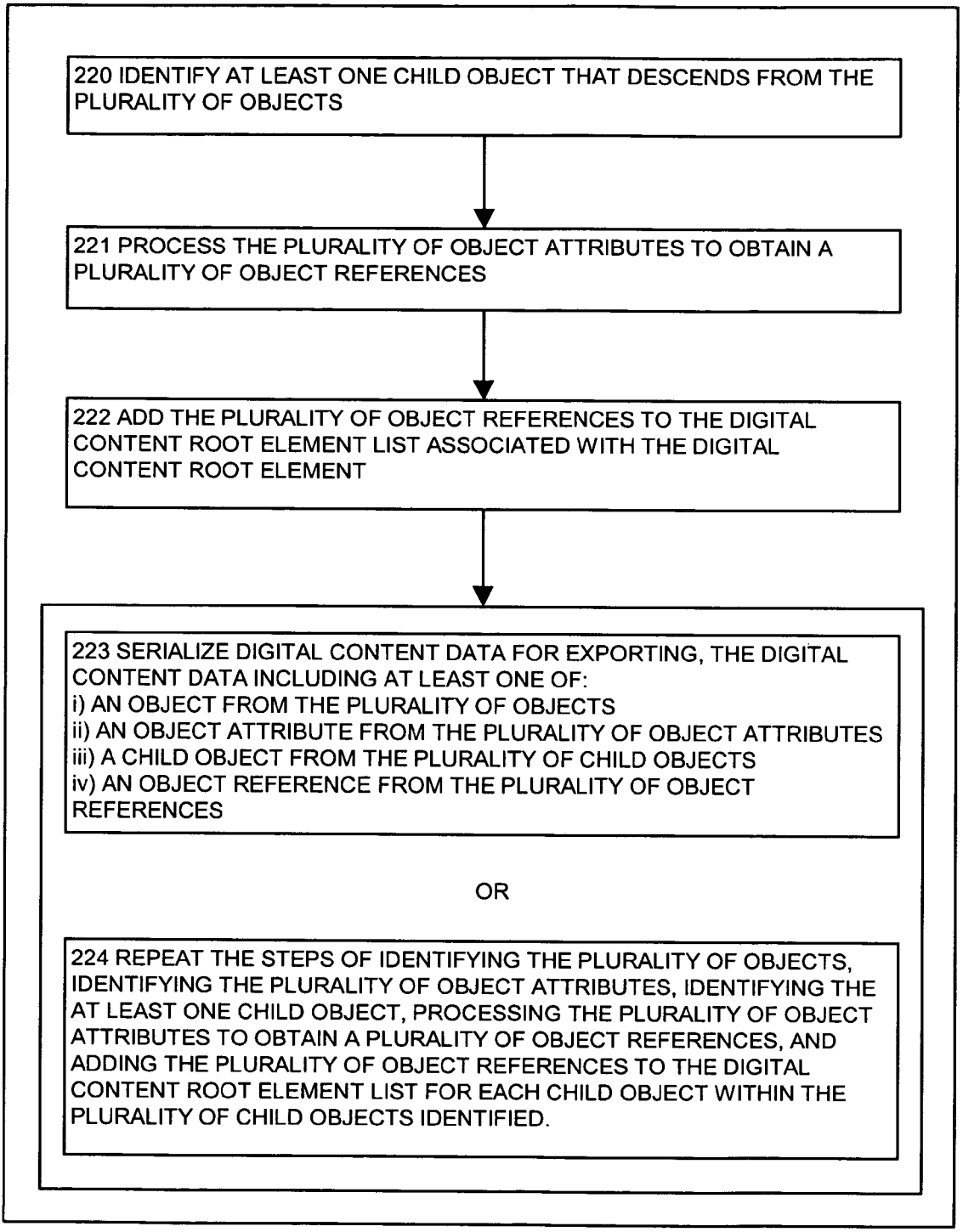
FIG. 8 illustrates a flowchart of a procedure performed by the system of FIG. 1, when the digital content formatting process applies at least one policy to each of the plurality of components to select those components necessary to recreate the portion of digital content, according to one embodiment disclosed herein.

FIG. 8 is an embodiment of the steps performed by the digital content formatting process 140-2 when it identifies at least one child object 165-1 that descend from the plurality of objects 155-N.

In step 220, the digital content formatting process 140-2 identifies at least one child object 165-1 that descends from the plurality of objects 155-N. In one embodiment, the digital content formatting process 140-2 traverses the logical tree 145 (that represents the entire digital content 120), and identifies (within the logical tree 145) the plurality of objects 155-N that correspond to the plurality of root element items (i.e., the text box object 155-1, text object 155-2, text font attribute 170-1, text size attribute 170-2, text color attribute 170-3, etc.) within the digital content root element list. As each object 155-1 is identified, the digital content formatting process 140-2 identifies the at least one child object 165-1 that correspond to that object 155-1.

In step 221, the digital content formatting process 140-2 processes the plurality of object attributes 170-N to obtain a plurality of object references. In an example embodiment, each object 155-1 in the logical tree 145 represents an object 155-1 contained within the document editor within the graphical user interface 160. Each object 155-1 has attributes 170-N that reflect the state of the object 155-1. An attribute 170-1 may contain a reference to another object 155-2. That referenced object (associated with the attribute 170-1) is an attribute object 175. Each object 155-1 can have child objects 165-N that descend from that object 155-1. The child objects 165-N can also have attributes 170-N and attribute objects 175-N that are referenced by the child object 165-1. The digital content formatting process 140-2 traverses the logical tree 145 (that represents the entire digital content 120), and identifies (within the logical tree 145) the plurality of objects 155-N that correspond to the plurality of root element items (i.e., the text box object 155-1, text object 155-2, text font attribute 170-1, text size attribute 170-2, text color attribute 170-3, etc.) within the digital content root element list. As each object 155-1 is identified, the digital content formatting process 140-2 processes the plurality of object attributes 170-N to obtain a plurality of object references.

In step 222, the digital content formatting process 140-2 adds the plurality of object references to the digital content root element list associated with the digital content root element (i.e., the starting point 150). In an example embodiment, the digital content formatting process 140-2 identifies objects 155-N, child objects 165-N of the objects 155-N, and attributes 170-N for both the objects 155-N, and the child objects 165-N. For example, a text box (i.e., a portion of digital content 125) is comprised of a text box object 155-1 and a text object 155-2. The text object 155-2 has an attribute 170-1 of the text font, and attribute 170-2 of the text size, and an attribute 170-3 of the text color. The digital content formatting process 140-2 identifies the plurality of these components 135-N (i.e., the text box object 155-1, text object 155-2, text font attribute 170-1, text size attribute 170-2, text color attribute 170-3, etc.) associated with the text box (i.e., the portion of digital content 125) received by the digital content formatting process 140-2. Thus, the digital content formatting process 140-2 identifies a plurality of root element items (i.e., the text box object 155-1, text object 155-2, text font attribute 170-1, text size attribute 170-2, text color attribute 170-3, etc.) within a digital content root element list associated with the digital content root element (i.e., the starting point 150) associated with the text box (i.e., the portion of digital content 125) received by the digital content formatting process 140-2. As the plurality of object attributes 170-N is identified, the digital content formatting process 140-2 adds the plurality of object references to the digital content root element list associated with the digital content root element (i.e., the starting point 150).

In step 223, the digital content formatting process 140-2 serializes digital content data 180 for exporting. The digital content data 180 includes at least one of an object 155-1 from the plurality of objects 155-N, an object attribute 170-1 from the plurality of object attributes 170-N, a child object 165-1 from the at least one child object 165-1, and an object reference from the plurality of object references. In an example embodiment, the digital content formatting process 140-2 serializes the digital content data 180 (for example, the objects 155-N and their attributes 170-N) into valid XML objects and output. The serialized digital content data 180 will be used by the digital content formatting process 140-2 to recreate the portion of digital content 125.

Alternatively, n step 224, the digital content formatting process 140-2 repeats the steps of identifying the plurality of objects 155-N, identifying the plurality of object attributes 170-N, identifying the at least one child object 165-1, processing the plurality of object attributes 170-N to obtain a plurality of object references, and adding the plurality of object references to the digital content root element list for each child object 165-1 within the at least one child object 165-1 identified. In an example embodiment, the digital content formatting process 140-2 identifies objects 155-N, child objects 165-N of the objects 155-N, and attributes 170-N for both the objects 155-N, and the child objects 165-N. For example, a text box (i.e., a portion of digital content 125) is comprised of a text box object 155-1 and a text object 155-2. The text object 155-2 has an attribute 170-1 of the text font, and attribute 170-2 of the text size, and an attribute 170-3 of the text color. The digital content formatting process 140-2 identifies the plurality of these components 135-N (i.e., the text box object 155-1, text object 155-2, text font attribute 170-1, text size attribute 170-2, text color attribute 170-3, etc.) associated with the text box (i.e., the portion of digital content 125) received by the digital content formatting process 140-2. Thus, the digital content formatting process 140-2 identifies a plurality of root element items (i.e., the text box object 155-1, text object 155-2, text font attribute 170-1, text size attribute 170-2, text color attribute 170-3, etc.) within a digital content root element list associated with the digital content root element (i.e., the starting point 150) associated with the text box (i.e., the portion of digital content 125) received by the digital content formatting process 140-2. As each object 155-1 is identified, the digital content formatting process 140-2 identifies the at least one child object 165-1 that correspond to that object 155-1. Those child objects 165-N are added to the digital content root element list associated with the digital content root element (i.e., the starting point 150). The digital content formatting process 140-2 repeats the steps of identifying the plurality of objects 155-N, identifying the plurality of object attributes 170-N, identifying the at least one child object 165-1, processing the plurality of object attributes 170-N to obtain a plurality of object references, and adding the plurality of object references to the digital content root element list for each child object 165-1 within the at least one child object 165-1 identified FIG. 9 is an embodiment of the steps performed by the digital content formatting process 140-2 when it applies at least one policy to each of the plurality of components 135-N to select those components necessary to recreate the portion of digital content 125.

In step 225, the digital content formatting process 140-2 applies at least one policy to each of the plurality of components 135-N to select those components necessary to recreate the portion of digital content 125. In an example embodiment, the digital content formatting process 140-2 traverses a logical tree 145 (that represents the entire digital content 120) to identify all objects 155-N related to the portion of digital content 125. The digital content formatting process 140-2 applies at least one policy to each of the objects 155-N identified during traversal of the logical tree 145 to determine whether that object 155-1 is needed to recreate the portion of digital content 125. As the digital content formatting process 140-2 identifies the text box object 155-1, the digital content formatting process 140-2 applies a policy to determine if the text box object 155-1 is needed to recreate the portion of digital content. The digital content formatting process 140-2 identifies text box object 155-1 and applies a policy to the text box object 155-1 to determine if the text box object 155-1 is needed to recreate the portion of digital content 125. The digital content formatting process 140-2 determines that the text box object 155-1 is needed.

In step 226, the digital content formatting process 140-2 receives notification that digital content data 180 has been identified. The digital content data 180 can include at least one of an object 155-1 from the plurality of objects 155-N, an object attribute 170-1 from the plurality of object attributes 170-N, a child object 165-1 from the at least one child object 165-1, and an object reference from the plurality of object references. In an example embodiment, a user 108, operating a document editor within the graphical user interface 160, selects a portion of digital content 125 from the entire digital content 120 within the document editor. For example, a user 108, operating a graphic design editor within the graphical user interface 160, selects a snippet (i.e., a portion of digital content 125) from the entire digital content 120, and the digital content formatting process 140-2 receives the selection of the snippet (i.e., a portion of digital content 125) from the document editor within the graphical user interface 160. As the digital content formatting process 140-2 receives the selection of the snippet (i.e., a portion of digital content 125) from the document editor within the graphical user interface 160, the digital content formatting process 140-2 receives notification that digital content data 180 has been identified.

In step 227, the digital content formatting process 140-2 applies a policy to the digital content data 180 to add the digital content data 180 to the plurality of components associated with the portion of digital content. In an example embodiment, the digital content formatting process 140-2 traverses a logical tree 145 (that represents the entire digital content 120) to identify all objects 155-N related to the portion of digital content 125. The digital content formatting process 140-2 applies at least one policy to each of the objects 155-N identified during traversal of the logical tree 145 to determine whether that object 155-1 is needed to recreate the portion of digital content 125. For example, a text box (i.e., a portion of digital content 125) is comprised of a text box object 155-1 and a text object 155-2. The text object 155-2 has an attribute 170-1 of the text font, and attribute 170-2 of the text size, and an attribute 170-3 of the text color. As the digital content formatting process 140-2 identifies the text box object 155-1, the digital content formatting process 140-2 applies a policy to determine if the text box object 155-1 is needed to recreate the portion of digital content. The digital content formatting process 140-2 determines that the text box object 155-1 is needed. Thus, the text box object 155-1 is selected as a component 135-1 necessary to recreate the portion of digital content 125.

In step 228, the digital content formatting process 140-2 applies a policy to the digital content data 180 to remove the digital content data 180 to the plurality of components associated with the portion of digital content. In an example embodiment, the digital content formatting process 140-2 traverses a logical tree 145 (that represents the entire digital content 120) to identify all objects 155-N related to the portion of digital content 125. The digital content formatting process 140-2 applies at least one policy to each of the objects 155-N identified during traversal of the logical tree 145 to determine whether that object 155-1 is needed to recreate the portion of digital content 125. For example, a text box (i.e., a portion of digital content 125) is comprised of a text box object 155-1 and a text object 155-2. The text object 155-2 has an attribute 170-1 of the text font, and attribute 170-2 of the text size, and an attribute 170-3 of the text color. As the digital content formatting process 140-2 identifies the text box object 155-1, the digital content formatting process 140-2 applies a policy to determine if the text box object 155-1 is needed to recreate the portion of digital content. In an example embodiment, the portion of digital content 125 contains two text boxes, text box object 155-1 and text box object 155-3. The digital content formatting process 140-2 identifies text box object 155-1 and applies a policy to the text box object 155-1 to determine if the text box object 155-1 is needed to recreate the portion of digital content 125. The digital content formatting process 140-2 determines that the text box object 155-1 is needed. The digital content formatting process 140-2 continues to traverse the logical tree 145 and identifies the text box object 155-3 and applies a policy to the text box object 155-3 to determine if the text box object 155-3 is needed to recreate the portion of digital content 125. The digital content formatting process 140-2 determines that the text box object 155-3 is not needed (because the text box object 155-1 can be used to recreate both text box object 155-1 and text box object 155-3). Thus, the text box object 155-1 is selected as a component 135-1 necessary to recreate the portion of digital content 125, and text box object 155-3 is not selected as a component 135-2 necessary to recreate the portion of digital content 125.

Figure 10:
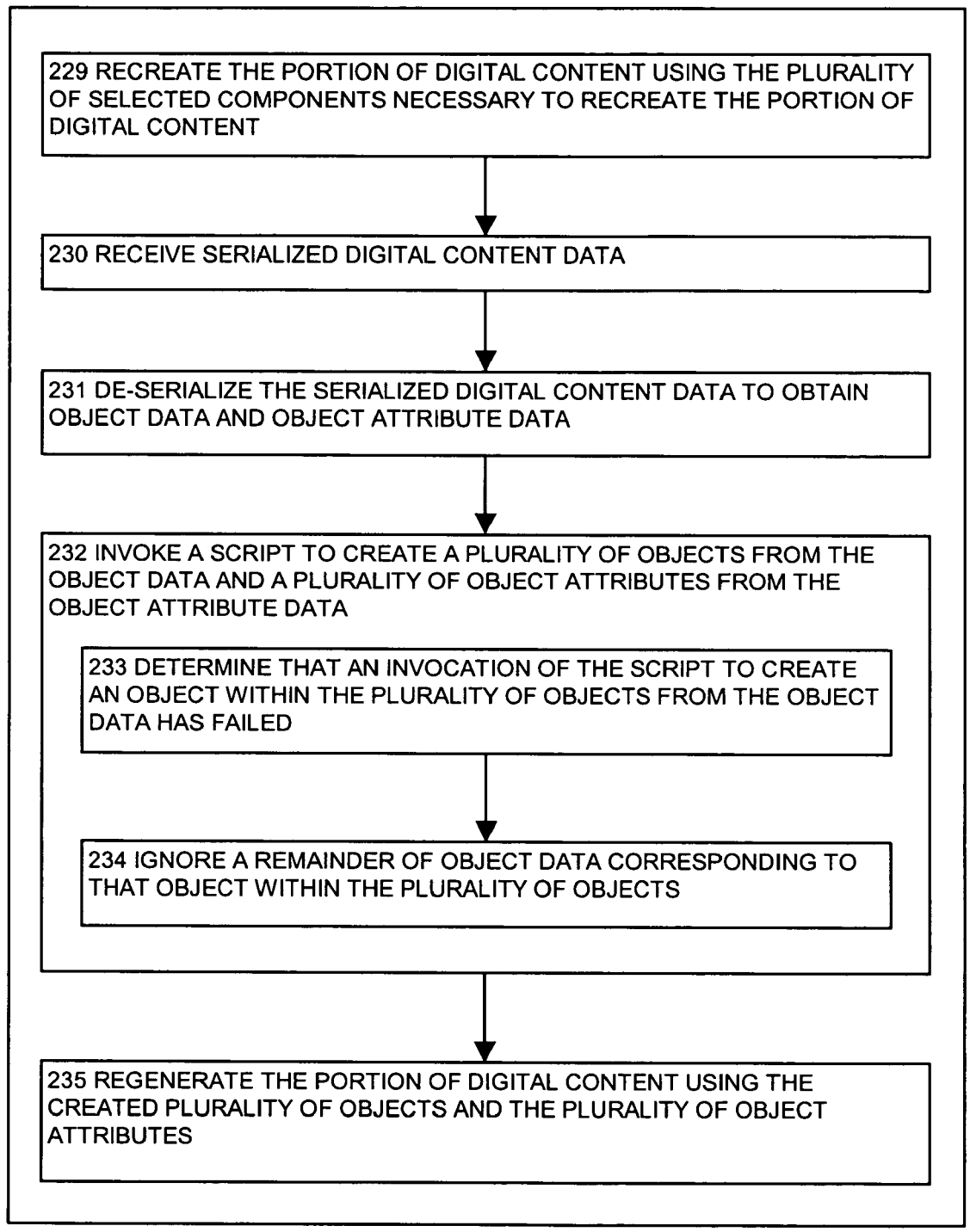
FIG. 10 is an embodiment of the steps performed by the digital content formatting process when it recreates the portion of digital content using the plurality of selected components necessary to recreate the portion of digital content.

FIG. 10 is an embodiment of the steps performed by the digital content formatting process 140-2 when it recreates the portion of digital content 125 using the plurality of selected components 135-N necessary to recreate the portion of digital content 125.

In step 229, the digital content formatting process 140-2 recreates the portion of digital content 125 using the plurality of selected components 135-1 necessary to recreate the portion of digital content 125. In an example embodiment, a user 108 selects a portion of digital content 125. The digital content formatting process 140-2 receives this selection of a portion of digital content 125. The digital content formatting process 140-2 traverses the entire digital content 120 to identify a plurality of components 135-N necessary to recreate the portion of digital content 125, and applies a policy to the plurality of components 135-N to determine which components 135-N are necessary to recreate the portion of digital content 125. The digital content formatting process 140-2 exports the portion of digital content 125, and the plurality of selected components 135-N necessary to recreate the portion of digital content 125. The digital content formatting process 140-2 then uses the portion of digital content 125, and the plurality of selected components 135-N to recreate the portion of digital content 125.

In step 230, the digital content formatting process 140-2 receives serialized digital content data 180. The digital content data 180 includes at least one of an object 155-1 from the plurality of objects 155-N, an object attribute 170-1 from the plurality of object attributes 170-N, a child object 165-1 from the at least one child object 165-1, and an object reference from the plurality of object references. In an example embodiment, the digital content formatting process 140-2 receives the serialized the digital content data 180 (for example, the objects 155-N and their attributes 170-N). The serialized digital content data 180 will be used by the digital content formatting process 140-2 to recreate the portion of digital content 125.

In step 231, the digital content formatting process 140-2 de-serializes the serialized digital content data 180 to obtain object data and object attribute data. In an example embodiment, a user 108, operating a document editor within the graphical user interface 160, selects a portion of digital content 125 from the entire digital content 120 within the document editor. For example, a user 108, operating a graphic design editor within the graphical user interface 160, selects a snippet (i.e., a portion of digital content 125) from the entire digital content 120, and the digital content formatting process 140-2 receives the selection of the snippet (i.e., a portion of digital content 125) from the document editor within the graphical user interface 160. As the user 108 drags the portion of digital content 120 to, for example, the computer desktop, the digital content formatting process 140-2 receives serialized digital content data 180, and de-serializes the serialized digital content data 180 to obtain object data and object attribute data.

In step 232, the digital content formatting process 140-2 invokes a script to create a plurality of objects 155-N from the object data and a plurality of object attributes 170-N from the object attribute data. In an example embodiment, the digital content formatting process 140-2 receives serialized digital content data 180, and de-serializes the serialized digital content data 180 to obtain object data and object attribute data. The digital content formatting process 140-2 invokes a script to create a plurality of objects 155-N from the object data and a plurality of object attributes 170-N from the object attribute data.

In step 233, the digital content formatting process 140-2 determines that an invocation of the script to create an object 155-1 within the plurality of objects 155-N from the object data has failed. In an example embodiment, digital content formatting process 140-2 invokes a script to create a plurality of objects 155-N from the object data and a plurality of object attributes 170-N from the object attribute data. During the execution of the script, the process of creating an object 155-1 from the object data (received within the serialized digital content data 180) fails. The digital content formatting process 140-2 determines that an invocation of the script to create an object 155-1 within the plurality of objects 155-N from the object data has failed.

In step 234, the digital content formatting process 140-2 ignores a remainder of object data corresponding to that object 155-1 within the plurality of objects 155-N. In an example embodiment, digital content formatting process 140-2 invokes a script to create a plurality of objects 155-N from the object data and a plurality of object attributes 170-N from the object attribute data. During the execution of the script, the process of creating an object 155-1 from the object data (received within the serialized digital content data 180) fails, and the digital content formatting process 140-2 ignore any remaining object data (i.e., object data corresponding to child objects 165-N, attributes 170-N, etc.), and does not try to create any of the remaining object data associated with that object 155-1. In an example embodiment, the digital content formatting process 140-2 then continues to invoke a script to create object 155-2.

In step 235, the digital content formatting process 140-2 regenerates the portion of digital content 125 using the created plurality of objects 155-N, and the plurality of object attributes 170-N. In an example embodiment, a user 108 has selected a snippet (i.e., a portion of digital content 125) and dragged the snippet (i.e., a portion of digital content 125) to the computer desktop. The digital content formatting process 140-2 regenerates the portion of digital content 125 on the desktop. The user 108 can also drag the snippet (i.e., a portion of digital content 125) to a library where the snippet (i.e., a portion of digital content 125) can be reused, even in earlier versions of the document editor within the graphical user interface 160.

While computer systems and methods have been particularly shown and described above with references to configurations thereof, it will be understood by those skilled in the art that various changes in form and details may be made therein without departing from the scope disclosed herein. Accordingly, the information disclosed herein is not intended to be limited by the example configurations provided above.

What is claimed is:

1. A computer readable medium encoded with computer programming logic that when executed on a process in a computerized device produces a digital content formatting process that exports digital content, the medium comprising:
   instructions for receiving a selection of a portion of digital content within a graphical user interface;
   instructions for traversing the entire digital content to identify a plurality of components associated with the portion of digital content wherein the instructions for traversing comprise;
      instructions for representing the entire digital content as a logical tree with a plurality of objects; and
      instructions for establishing a starting point to traverse the logical tree that represents the entire digital content;
   instructions for applying at least one policy to each of the plurality of components to select those components necessary to recreate the portion of digital content; and
   instructions for exporting the portion of digital content and the plurality of selected components necessary to recreate the portion of digital content.

2. The computer readable medium of claim 1 further comprising:
   instructions for recreating the portion of digital content using the plurality of selected components necessary to recreate the portion of digital content.

3. The computer readable medium of claim 1 wherein the instructions for receiving a selection of a portion of digital content within a graphical user interface comprise:
   instructions for receiving a selection of a plurality of portions of digital content within a graphical user interface.

4. The computer readable medium of claim 1 wherein the instructions for representing the entire digital content as a logical tree with a plurality of objects comprise:
   instructions for representing the entire digital content as a logical tree comprised of a plurality of sub trees, each of the plurality of sub trees comprised of a plurality of objects.

5. The computer readable medium of claim 1 wherein the instructions for establishing a starting point to traverse the logical tree that represents the entire digital content comprise:
   instructions for establishing a starting point at any point in the logical tree and the plurality of sub trees.

6. The computer readable medium of claim 4 wherein the instructions for representing the entire digital content as a logical tree with a plurality of objects comprise:
   instructions for representing at least one set of child objects, the set of child objects descending from a respective object within the plurality of objects.

7. The computer readable medium of claim 4 wherein each object within the plurality of objects contains attributes, and wherein the instructions for representing the entire digital content as a logical tree with a plurality of objects comprise:
   instructions for representing an object reference, the object reference depicting a reference between an attribute of an object within the plurality of objects and an attribute object within the plurality of objects.

8. The computer readable medium of claim 1 wherein the instructions for applying at least one policy to each of the plurality of components to select those components necessary to recreate the portion of digital content comprise:

instructions for receiving notification that digital content data has been identified; and instructions for applying a policy to the digital content data to add the digital content data from the plurality of components associated with the portion of digital content.

9. The computer readable medium of claim 1 wherein the instructions for applying at least one policy to each of the plurality of components to select those components necessary to recreate the portion of digital content comprise:

instructions for applying a policy to the digital content data to remove the digital content data to the plurality of components associated with the portion of digital content.

10. The computer readable medium of claim 2 wherein the instructions for recreating the portion of digital content using the plurality of selected components necessary to recreate the portion of digital content comprise:

instructions for receiving serialized digital content data;

instructions for de-serializing the serialized digital content data to obtain object data and object attribute data;

instructions for invoking a script to create a plurality of objects from the object data and a plurality of object attributes from the object attribute data; and instructions for regenerating the portion of digital content using the created plurality of objects and the plurality of object attributes.

11. The computer readable medium of claim 10 wherein the instructions for invoking a script to create a plurality of objects from the object data and a plurality of object attributes from the object attribute data comprise:

instructions for determining that an invocation of the script to create an object within the plurality of objects from the object data has failed; and instructions for ignoring a remainder of object data corresponding to that object within the plurality of objects.

12. A method comprising:

receiving a selection of a portion of digital content within a graphical user interface;

traversing the entire digital content to identify a plurality of components associated with the portion of digital content wherein traversing comprises;

identifying a digital content root element;

identifying a plurality of root element items within a digital content root element list associated with the digital content root element;

identifying a plurality of objects that correspond to the plurality of root element items within the digital content root element list;

identifying a plurality of object attributes that correspond to the plurality of objects; and identifying at least one child object that descend from the plurality of objects;

applying at least one policy to each of the plurality of components to select those components necessary to recreate the portion of digital content; and exporting the portion of digital content and the plurality of selected components necessary to recreate the portion of digital content.

13. The method of claim 12 comprising:

processing the plurality of object attributes to obtain a plurality of object references; and adding the plurality of object references to the digital content root element list associated with the digital content root element.

14. A computerized device comprising:

a memory;

a processor;

a communications interface;

an interconnection mechanism coupling the memory, the processor and the communications interface;

wherein the memory is encoded with a digital content formatting application that when executed on the processor exports digital content on the computerized device by performing the operations of:

receiving a selection of a portion of digital content within a graphical user interface;

traversing the entire digital content to identify a plurality of components associated with the portion of digital content wherein traversing comprises;

representing the entire digital content as a logical tree with a plurality of objects; and establishing a starting point to traverse the logical tree that represents the entire digital content;

applying at least one policy to each of the plurality of components to select those components necessary to recreate the portion of digital content; and exporting the portion of digital content and the plurality of selected components necessary to recreate the portion of digital content.

15. The method of claim 13 comprising:

serializing digital content data for exporting, the digital content data including at least one of:

i) an object from the plurality of objects;

ii) an object attribute from the plurality of object attributes;

iii) a child object; and iv) an object reference from the plurality of object references.

16. The method of claim 13 comprising:

repeating the steps of identifying the plurality of objects, identifying the plurality of object attributes, identifying the at least one child object, processing the plurality of object attributes to obtain a plurality of object references, and adding the plurality of object references to the digital content root element list for each child object within the at least one child object identified.

17. The method of claim 15 wherein the serialized digital content data is formatted in extensible markup language (XML).

18. The computer readable medium of claim 1 wherein instructions for representing the entire digital content as a logical tree with a plurality of objects comprise:

instructions for identifying a hyperlink associated with an object;

instructions for identifying a hyperlinked object associated with the hyperlink; and including the hyperlinked object within the plurality of objects.

19. The method of claim 12 wherein identifying a plurality of objects that correspond to the plurality of root element items within the digital content root element list comprises:

identifying a hyperlink associated with an object;

identifying a hyperlinked object associated with the hyperlink; and including the hyperlinked object within the plurality of objects.

20. The computer readable medium of claim 11 comprising:

instructions for invoking the script to create a subsequent object within the plurality of objects.

* * * * *